United States Patent
Hamamoto et al.

(10) Patent No.: US 6,699,998 B2
(45) Date of Patent: Mar. 2, 2004

(54) NON-AQUEOUS ELECTROLYTE AND LITHIUM SECONDARY BATTERY USING THE SAME

(75) Inventors: Toshikazu Hamamoto, Ube (JP); Koji Abe, Ube (JP); Tsutomu Takai, Ube (JP); Yasuo Matsumori, Ube (JP)

(73) Assignee: UBE Industries, Ltd. (JP)

( * ) Notice: Subject to any disclaimer, the term of this patent is extended or adjusted under 35 U.S.C. 154(b) by 9 days.

(21) Appl. No.: 10/109,943

(22) Filed: Mar. 29, 2002

(65) Prior Publication Data

US 2002/0168576 A1 Nov. 14, 2002

Related U.S. Application Data

(62) Division of application No. 09/458,274, filed on Dec. 9, 1999, now Pat. No. 6,413,678.

(30) Foreign Application Priority Data

Aug. 27, 1998 (JP) .......................................... 10-241388
Mar. 3, 1999 (JP) ............................................. 11-55210

(51) Int. Cl.[7] ........................ C07D 317/12; C07C 69/96
(52) U.S. Cl. ........................................ 549/229; 558/260
(58) Field of Search ........................... 549/229; 558/260

(56) References Cited

U.S. PATENT DOCUMENTS 5,352,548 A   10/1994  Fujimoto et al. ............ 429/197
5,714,281 A    2/1998  Naruse et al. ............... 429/197

FOREIGN PATENT DOCUMENTS

JP   6-52887   2/1994
JP   8-45545   2/1996
JP   8-96852   4/1996

OTHER PUBLICATIONS

Newman et al., J. Am. Chem. Soc., vol. 75, pp. 1263–1264.*

* cited by examiner

*Primary Examiner*—Joseph K. McKane
*Assistant Examiner*—Ebenezer Sackey
(74) *Attorney, Agent, or Firm*—Morgan, Lewis & Bockius LLP

(57) ABSTRACT

A non-aqueous electrolyte comprising a non-aqueous solvent and a lithium salt dissolved therein, and a cyclic carbonate, linear carbonate, and vinylene carbonate having a chlorine content of 100 ppm or less, and a lithium secondary battery using the same.

7 Claims, 4 Drawing Sheets

NON-AQUEOUS ELECTROLYTE AND LITHIUM SECONDARY BATTERY USING THE SAME

REFERENCE TO RELATED APPLICATION

This application is a divisional of U.S. patent application Ser. No. 09/458,274 filed on Dec. 9, 1999 now U.S. Pat. No. 6,413,678, which is incorporated herein by reference in its entirety.

BACKGROUND OF THE INVENTION

1. Field of the Invention

The present invention relates a non-aqueous electrolyte and a lithium secondary battery using the same.

2. Description of the Related Art

In recent years, use of compact electronic devices such as personal computers, cellular telephones, camcorders, has remarkably spread. As the sources of power for driving these compact electronic devices, compact, light weight, and high capacity secondary batteries are in strong demand.

From these perspectives, a lithium secondary battery having a complex oxide such as lithium cobalt dioxide, lithium nickel dioxide, or lithium manganese oxide as a cathode active material, a carbonaceous material capable of doping and undoped with lithium ions as an anode active material, and a non-aqueous electrolyte comprised of a non-aqueous solvent in which is dissolved a lithium salt has been considered suitable. Research and development are progressing rapidly with the aim of further improvement.

Among the carbonaceous materials capable of doping and undoping the same with lithium ions, graphite is one of the optimum compounds as the anode active material for a lithium secondary battery since it has the characteristics of (1) a large electrical capacity and (2) a high flatness of electric potential.

However, if cyclic carbonates such as ethylene carbonate (EC), propylene carbonate (PC), butylene carbonate (BC) are used as the electrolyte solvent in a lithium secondary battery using a graphite-based material as an anode active material, these carbonates are decomposed by the graphite-based anode active material. At that time, exfoliation of the carbonaceous material will occur and the battery characteristics such as electric capacity, cycle characteristics, storage characteristics, are decreased. In particular, this phenomenon remarkably appears with an electrolyte containing PC. At the time of initial charging, the PC is decomposed by the graphite anode and therefore, charging-discharging becomes impossible.

As methods for suppressing the decomposition of the cyclic carbonates in the electrolyte by the graphite-based anode active material and the exfoliation of the carbonaceous material, various additives have been proposed. For example, *J. Electrochem. Soc.*, vol. 140, no. 6, L101 (1993) proposes the addition of crown ether (12-crown-4) to an electrolyte having a PC and EC base. In this case, however, unless adding a considerably large amount of the expensive crown ether, the effect of suppressing the decomposition is small and the battery characteristics are still insufficient, and therefore, practical problems remain. Further, Japanese Unexamined Patent Publication (Kokai) No. 8-45545 (i.e., U.S. Pat. No. 5,626,981) discloses the addition of vinylene carbonate (hereinafter referred to as "VC") so as to suppress the decomposition of an electrolyte having a PC or EC base. According to this method, the additive is reduced by the anode at the time of charging, a passivation film is formed on the surface of the graphite, and the reduction of the other solvents such as PC, EC are suppressed.

However, the initial coulomb (charge-discharge) efficiency is not necessarily high with these methods. In addition, repeated charge-discharging causes the electric capacity to gradually drop, and therefore, a satisfactory cycle characteristics and storage characteristics cannot be obtained.

1997 *Joint International Meeting of the Electrochemical Society, Inc. and International Society of Electrochemistry, Abstracts*, p. 153 (1997) reports that in voltamogram measurement using a cell having an electrolyte containing 5% by volume of VC and a 1M $LiPF_6$, and having a volume ratio of PC/EC/DMC (where DMC indicates dimethyl carbonate) of 1/1/3 and having a graphite electrode (working electrode)/Li (counter electrode)/Li (reference electrode), a reduction peak appears at 1V and this forms a passivation film on the anode and suppresses the reduction of the other solvents.

Further, *J. Electrochem. Soc.*, vol. 140, no. 9, L161 (1995) states that the addition of chloroethylene carbonate to an electrolyte suppresses the decomposition of the PC at the surface of a graphite electrode. This is believed to be because the decomposition products of the chloroethylene carbonate form a passivation film at the surface of the graphite. However, the effect of suppression of decomposition of the electrolyte is not necessarily good.

While the above methods enable the use of cyclic carbonate at highly crystalline carbon anodes such as graphite, the battery characteristics are still not sufficient.

SUMMARY OF INVENTION

The objects of the present invention are to solve the above-mentioned problems in the prior art and to provide a non-aqueous electrolyte capable of providing secondary battery having the electric capacity of a lithium battery and superior cycle characteristics and storage characteristics and to a lithium secondary battery using the same.

In accordance with the present invention, there is provided a non-aqueous electrolyte comprising a non-aqueous solvent and a lithium salt dissolved therein and a cyclic carbonate, linear carbonate, and a vinylene carbonate having a chlorine content of 100 ppm or less.

In accordance with the present invention there is also provided a lithium secondary battery comprising a cathode, a graphite anode having a lattice spacing ($d_{002}$) of 0.34 nm or less, and a non-aqueous electrolyte comprising a lithium salt dissolved in a non-aqueous solvent, wherein the non-aqueous electrolyte contains, as the electrolyte, a cyclic carbonate, linear carbonate, and vinylene carbonate having a chlorine content of 100 ppm or less.

The present inventors made an intensive research on the effects of VC on suppression of the electrolyte decomposition at the surface of a graphite electrode, and learned that an electrolyte including VC produced by the conventional method did not have a satisfactory battery characteristics and further that it did not have a reproducible data in the battery characteristics. Further, we engaged in repeated studies and, as a result, found that VC produced by the conventional method inevitably contained a considerable amount of organic chlorine impurities, which caused a deterioration in the battery characteristics and it did not have a reproducible data in the battery characteristics.

BRIEF EXPLANATION OF THE DRAWINGS

The present invention will now be explained with reference to the attached drawings, wherein.

DETAILED DESCRIPTION OF PREFERRED EMBODIMENTS

Figure 1:
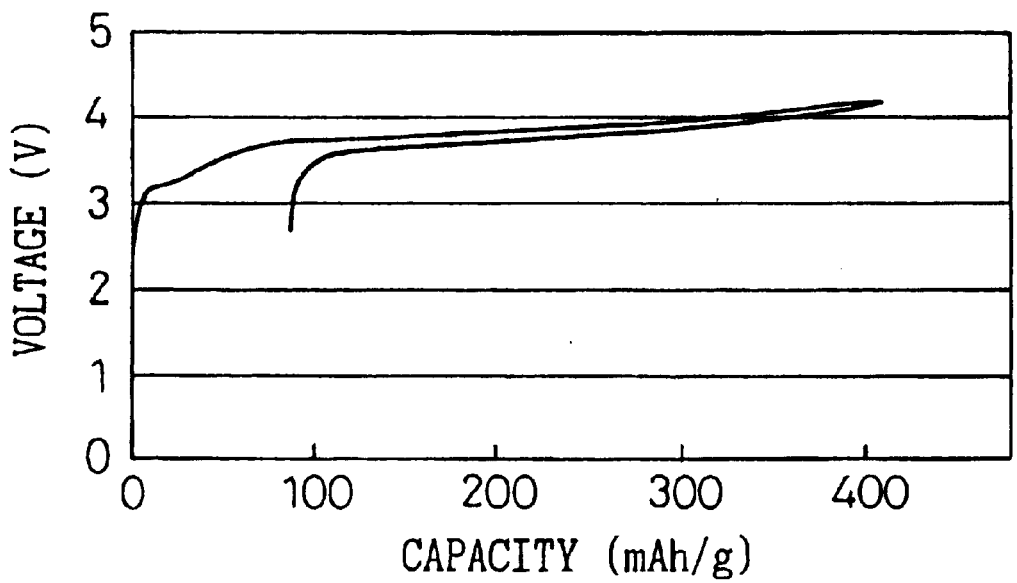
FIG. 1 is a view of the charge-discharge characteristics of Example 1.

According to the present invention, by introducing vinylene carbonate having a chlorine content of 100 ppm or less into the electrolyte, it is possible to provide an electrolyte having superior battery characteristics and further reproducible in the battery characteristics and a lithium secondary battery using the same.

The specific action and effect on the battery characteristics due to the reduction of the amount of chlorine in the present invention are not clear, but are believed to be as follows:

Organic chlorine compounds as shown by the chemical formulae of the following Formula 1 to Formula 3 ordinarily contained in VC in an amount of at least 3000 ppm have higher reduction potentials than VC or an electrolyte composition. They are reduced at the surface of the anode graphite before the VC or electrolyte composition to form a film there and, therefore, have the effect of suppressing the decomposition of the VC or electrolyte to some extent.

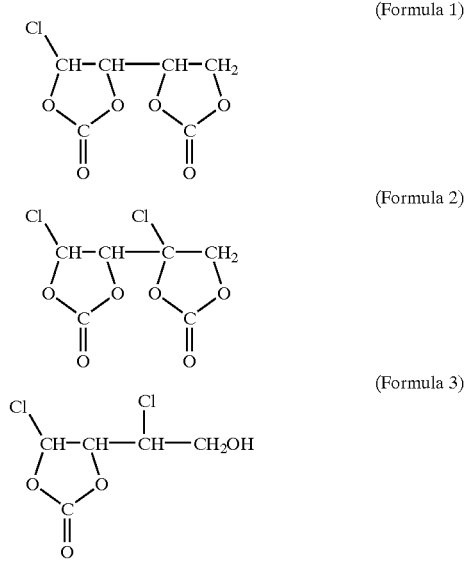

However, the film formed contains chlorine. Further, it is believed that a sufficiently satisfactory effect is not exhibited since the film is thick. That is, it is believed that the organic chlorine impurities in the VC inhibit the inherent performance of VC and prevent a sufficient effect from being imparted.

Therefore, the present inventors engaged in intensive studies on the method of synthesis and purification of VC and, as a result, found a method for producing high purity VC having an extremely small content of chlorine impurities. That is, as a conventional method of VC synthesis, as described in *J. Am. Chem. Soc.*, 75, 1263 (1953) etc., there is known the method of producing VC by synthesizing monochloroethylene carbonate by a chlorination reaction of EC (first step) and causing a dechlorohydrogenation reaction thereof in an ether-based low boiling point solvent (second step).

The inventors found a method of producing high purity VC not containing almost any organic chlorine compounds by replacing the solvent of the second step with an ester-based high boiling point solvent such as dibutyl carbonate (DBC) and further purifying it by the methods of distillation, treating by a silica gel column and/or crystallization.

Namely, VC having a high purity can be produced at a high yield with safety from the dehydrochlorination reaction of a monochloroethylene carbonate using an amine in a solvent having a high boiling point composed of an ester or hydrocarbon having a boiling point of 170–300° C., followed by, if necessary, removing the amine hydrochloride by, for example, filtration, and, thus the filtrate is distilled to obtain VC before the distillation of the high boiling point solvent. When a high boiling point solvent composed of an ester or a hydrocarbon is used, VC is first distilled out, without concentrating the reaction solution. Furthermore, when the reaction mixture containing a low concentration of VC in the high boiling point solvent is distilled, VC is first distilled out from the reaction mixture and, as a result, VC can be quantitatively obtained for a relatively short period of time, without retaining as a still residue. Thus, the purity and yield of VC are improved. The purity can be further improved by crystallization.

The high boiling point solvents usable in the present invention are esters such as carbonates and carboxylic esters and hydrocarbons having a boiling point of 170–300° C., especially preferably 180–250° C. Typical examples of those solvents are carbonates such as dibutyl carbonate ("DBC" hereinbelow), diisobutyl carbonate, dipentyl carbonate, dihexyl carbonate, dicyclohexyl carbonate, propylene carbonate, butylene carbonate, 1,2-methoxycarbonyl oxyethane; carboxylic esters such as octyl acetate, phenyl acetate, benzyl acetate, cyclohexyl acetate, hexyl propionate, phenyl propionate, methyl benzoate, ethyl benzoate, methyl phenylacetate, dimethyl adipate, diethyl malonate, dimethyl phthalate, ethyleneglycol diacetate, ε-caprolactone, γ-butyrolactone; and hydrocarbons such as butylbenzene, sec-butylbenzene, cymene, diethylbenzene, 1-phenylhexane.

A lithium secondary battery using an electrolyte having this high purity VC as an additive has an extremely superior electric capacity, cycle characteristics, and storage characteristics.

Specific embodiments of the present invention will now be further explained.

In the electrolyte for a lithium secondary battery of the present invention, the chlorine content in the high purity VC should be 100 ppm or less, particularly preferably 50 ppm or less. If the chlorine content is high, the battery performance is decreased.

Further, the content of the high purity VC in the non-aqueous solvent is preferably from 0.01% by weight to 10% by weight, particularly preferably 0.1% by weight to 5% by weight. If the amount of the high purity VC is too small, the electrolyte easily decomposes at the graphite anode, while if too large, the battery characteristics become poor.

As cyclic carbonates, EC, PC, BC, etc. may be mentioned. These carbonates may be used alone or in any mixture thereof. As the linear carbonates, dimethyl carbonate (DMC), methylethyl carbonate (MEC), diethyl carbonate (DEC), methylpropyl carbonate (MPC), methylbutyl carbonate (MBC), etc. may be mentioned. These carbonates may be used alone or in any mixture thereof. Further, the ratio of the cyclic carbonates and the linear carbonates is preferably 2:8 to 6:4 in terms of volume ratio.

The lithium salts usable in the present invention, include $LiPF_6$, $LiBF_4$, $LiClO_4$, $LiN(SO_2CF_3)_2$, $LiN(SO_2C_2F_5)_2$, $LiC(SO_2CF_3)_3$, etc. These lithium salts may be used alone or in any combination thereof. These lithium salts are normally used in concentrations of 0.1 to 3M, preferably 0.5 to 1.5M.

The non-aqueous electrolyte of the present invention can be obtained by, for example, mixing the cyclic carbonate, linear carbonate, and high purity VC of the above-mentioned non-aqueous solvent and adding the lithium salts thereto.

The non-aqueous electrolyte of the present invention is suitably used as a component of a lithium secondary battery. The components, other than the electrolyte, constituting the secondary battery are not particularly limited. Various components used in the prior art may be used.

For example, as the cathode active material, a complex metal oxide of at least one metal selected from the group comprising cobalt, nickel, manganese, chromium, vanadium, and iron with lithium is used. Examples of such a complex metal oxide are $LiCoO_2$, $LiNiO_2$, $LiMn_2O_4$, etc.

The cathode can be prepared by mixing the cathode active material with a conductive agent such as acetylene black or carbon black, a binder such as polyvinylidene fluoride (PVDF), polytetrafluoroethylene (PTFE), and N-methylpyrrolidone solvent to form a cathode paste, then coating this cathode paste on a collector such as aluminum foil or a stainless steel lath, drying at 50 to 250° C., followed by compression molding.

The anode active materials include natural or artificial graphite having a lattice spacing ($d_{002}$) of not more than 0.34 nm is preferred. The anode is prepared by mixing the above graphite with a binder such as PVDF, PTFE, or ethylene propylene diene terpolymer (EPDM) and a N-methylpyrrolidone solvent to form an anode paste, then coating this anode paste on a collector such as a copper foil or a stainless steel lath, drying at 50 to 250° C., followed by compression molding.

The configuration of the lithium secondary battery is not particularly limited. A coin battery having cathode, anode, permeable membrane separator, and electrolyte or a cylindrical battery, battery pack, layered battery, etc. may be exemplified.

EXAMPLES

The present invention will now be further explained in detail, but is by no means limited to, the following Examples and Comparative Examples.

VC Used

The supplier, synthesis methods, and properties of the three types of VC used in the later explained Examples 1 to 6 and Comparative Examples 1 to 6 are shown next.

Supplier and Synthesis Methods of VC (1) VC Available from Aldrich

VC commercially available, as a reagent, from Aldrich Chemical Co., Ltd. was used. This VC is referred to as "Aldrich VC" hereinbelow.

(2) Synthesis of VC by Known Method

VC was synthesized according to the method of *J. Am. Chem. Soc.*, 75, 1263 (1953) and *J. Am. Chem. Soc.*, 77, 3789 (1955). That is, chlorine gas was blown into 600 g of EC previously purified by distillation and a reaction was carried out, under irradiation by ultraviolet light, at 65° C. for 24 hours. After the reaction, 560 g of monochloroethylene carbonate was obtained by vacuum distillation. Then, 493 g of monochloroethylene carbonate was dissolved in 500 ml of dry diethyl ether, 440 g of triethylamine was dropwise added thereto under refluxing over 6 hours, and the resultant mixture was stirred for 14 hours, while refluxing. Thereafter, the solid triethylamine hydrochloride was filtered and washed by a mixed solvent of ether and n-hexane. The filtrate was processed by distillation to distill off the solvent and the excess amine, then was processed by distillation under 30 mmHg reduced pressure to obtain 290 g of VC fraction. This VC was further rectified under 30 mmHg reduced pressure to obtain 104 g of VC having a boiling point of 73° C. This VC is referred to as "conventional synthesis method VC" hereinbelow.

(3) Synthesis of High Purity VC

Monochloroethylene carbonate was synthesized by the above-mentioned method (2). 494 g of the monochloroethylene carbonate obtained was dissolved in 500 ml of dibutyl carbonate (DBC) and fed into a 2 liter reactor. 440 g of triethylamine was dropwise added thereto at 50° C. over 6 hours for a reaction and the resultant mixture was stirred for a further 14 hours. Then, the reaction solution was cooled to room temperature and the triethylamine hydrochloride was obtained by filtration and sufficiently washed with DBC. 2100 g of the filtrate obtained was processed by distillation under 30 mmHg reduced pressure to distill off the excess triethylamine, to thereby obtain 390 g of VC fraction. The VC was treated by a silica gel column, then rectified under 30 mmHg reduced pressure to obtain 195 g of VC with extremely little impurities and a boiling point of 73° C. The VC thus obtained is referred to as "high purity VC" hereinbelow.

Gas Chromatography/Mass Spectrometry

In the gas chromatography/mass spectrometry of the Aldrich VC and the conventional synthesis method VC, small amounts, but large number of types of impurities were detected. Gas chromatography/mass spectrometry was performed and, as a result, it was concluded that chlorine impurities having believed to be of Formula 1, Formula 2, and Formula 3, believed to have been produced at the time of synthesis of the VC, were contained. However, almost no impurities were observed in the high purity VC. Chlorine impurities believed to be those of Formula 1, Formula 2, and Formula 3 were also not detected.

Amount of Chlorine in VC

The VC was burned in an oxyhydrogen flame, the vapor was absorbed in water, and the chlorine ions in the absorbed solution were measured by ion chromatography. The results are shown in Table 1. Chlorine was contained in the large amounts of 3200 ppm for the Aldrich VC and 3550 ppm for the conventional synthesis method VC, but in an extremely small 29 ppm for the high purity VC.

TABLE 1

| | Chlorine content |
|---|---|
| Aldrich VC | 3200 ppm |
| Conventional synthesis method VC | 3550 ppm |
| High purity VC | 29 ppm |

Example 1

Preparation of Electrolyte

A non-aqueous solvent was prepared by adding 2% by weight of the high purity VC to a mixed solvent of PC and DMC of a volume ratio of 1:2. $LiPF_6$ was dissolved in this to a concentration of 1M to prepare the electrolyte.

Preparation of Lithium Secondary Battery and Measurement of Battery Characteristics 80% by weight of $LiCoO_2$ (cathode active material), 10% by weight of acetylene black (conductive agent), and 10% by weight of polyvinylidene fluoride (binder) were mixed and diluted by N-methylpyrrolidone to prepare a cathode paste. The paste was coated on an aluminum foil collector, dried, and compression molded to form the cathode. On the other hand, 90% by weight of natural graphite ($d_{002}$=0.3354) and 10% by weight of polyvinylidene fluoride (binder) were mixed and diluted by N-methylpyrrolidone to prepare an anode paste. This paste was coated on a copper foil collector, dried, and compression molded to form the anode. The ratio of the cathode and anode was made to give substantially the same electric capacity.

A coin type battery comprised of these cathode and anode, separator comprised of polypropylene microporous film, and electrolyte (diameter 20 mm, thickness 3.2 mm) was prepared and charged at room temperature (25° C.) by a constant current of 0.8 mA to a voltage of 4.2V by constant voltage for 5 hours, then discharged by a constant current of 0.8 mA to a voltage of 2.7V. FIG. 1 shows the initial charge-discharge characteristic with the ordinate showing the battery voltage (V) and the abscissa showing the capacity (mAh/g carbon). Further, the charge and discharge operation was repeated to investigate the change in cycles of the discharge capacity.

Comparative Example 1

The same procedure was followed as in Example 1, except that no VC was added, to prepare a battery and a charge-discharge test conducted. At the time of initial charging, however, the PC decomposed and the predetermined voltage was not reached and discharge was not possible. The battery was disassembled after recharging and, as a result, it was found that the graphite of the anode had peeled off.

Comparative Example 2

Figure 2:
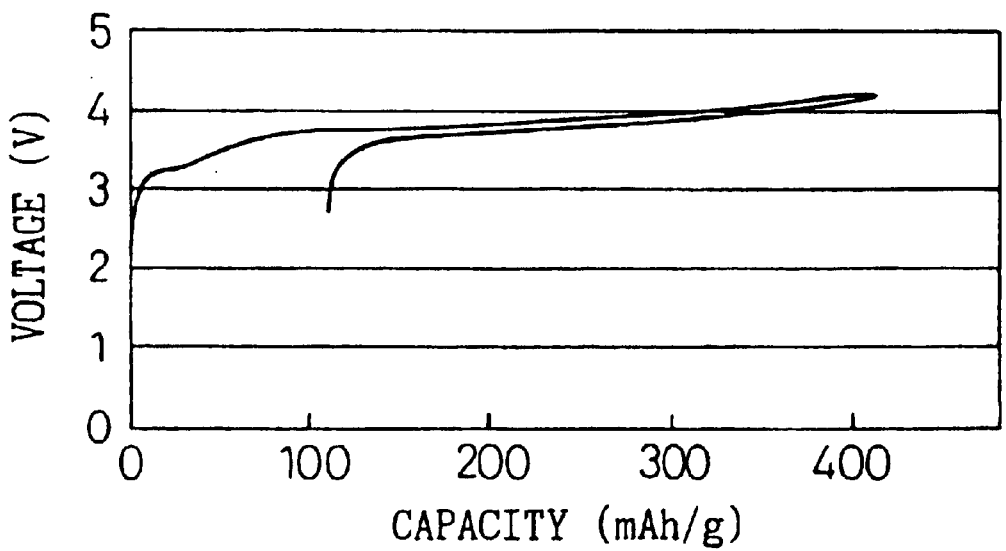
FIG. 2 is a view of the charge-discharge characteristics of Comparative Example 2.

The same procedure was followed as in Example 1 except that, instead of high purity VC, Aldrich VC was used, to prepare a battery and a charge-discharge test conducted. FIG. 2 shows the initial charge-discharge characteristics.

Comparative Example 3

The same procedure was followed as in Example 1 except that, instead of high purity VC, conventional synthesis method VC was used, to prepare a battery and a charge-discharge test conducted.

The initial coulomb efficiency of Example 1 and Comparative Examples 2 to 3 are shown in Table 2. As clear from the results of Table 2, a good coulomb efficiency is obtained by use of high purity VC.

TABLE 2

| | Electrolyte solvent (volume ratio) | VC | Coulomb efficiency (%) |
|---|---|---|---|
| Example 1 | PC/DMC = 1/2 | High purity VC (2 wt %) | 78 |
| Comp. Ex. 1 | PC/DMC = 1/2 | None | Charge-discharge not possible |
| Comp. Ex. 2 | PC/DMC = 1/2 | Aldrich VC (2 wt %) | 73 |
| Comp. Ex. 3 | PC/DMC = 1/2 | Conventional synthesis method VC (2 wt %) | 74 |

Figure 3:
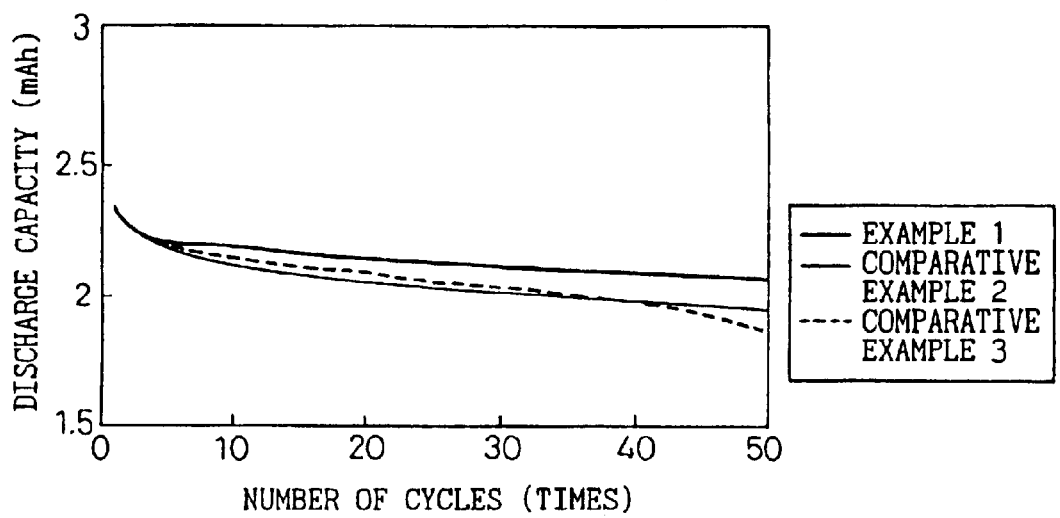
FIG. 3 is a view of the cycle characteristics of Example 1, Comparative Example 2, and Comparative Example 3.

FIG. 3 shows the cycle characteristics of Example 1, Comparative Example 2, and Comparative Example 3 with the ordinate showing the discharge capacity (mAh) and the abscissa showing the number of cycles.

As will be understood from FIG. 3, compared with Comparative Example 2 using Aldrich VC and Comparative Example 3 using conventional synthesis method VC, good cycle characteristics was maintained in Example 1, in which the high purity VC was used.

Example 2

Figure 4:
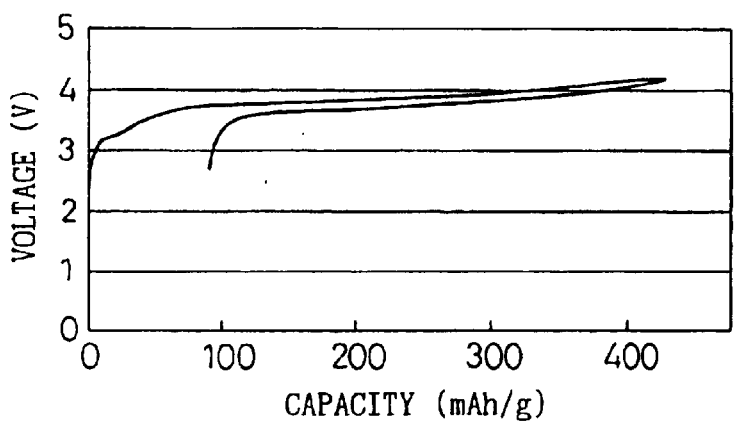
FIG. 4 is a view of the charge-discharge characteristics of Example 2.

The same procedure was followed as in Example 1 except instead of the mixed solvent of a volume ratio 1:2 of PC and DMC, a mixed solvent of EC and DMC having a volume ratio of 1:1 was used, to prepare a battery and a charge-discharge test conducted. FIG. 4 shows the initial charge-discharge curve.

Comparative Example 4

Figure 5:
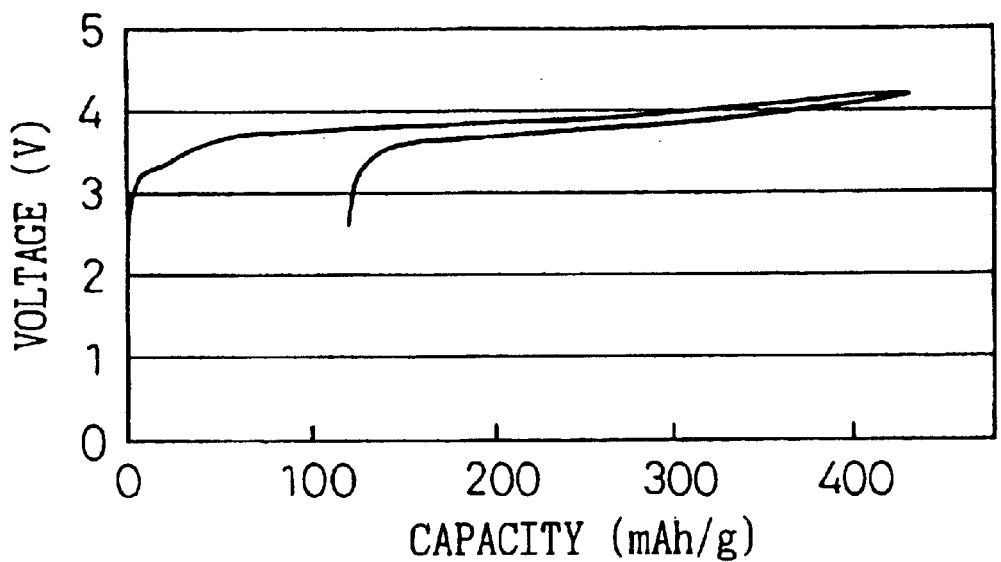
FIG. 5 is a view of the charge-discharge characteristics of Comparative Example 4.

The same procedure was followed as in Example 2 except that no VC was used, to prepare a battery and a charge-discharge test conducted. FIG. 5 shows the initial charge-discharge curve.

Comparative Example 5

The same procedure was followed as in Example 2 except that, instead of the high purity VC, Aldrich VC was used, to prepare a battery and a charge-discharge test conducted.

Comparative Example 6

Figure 6:
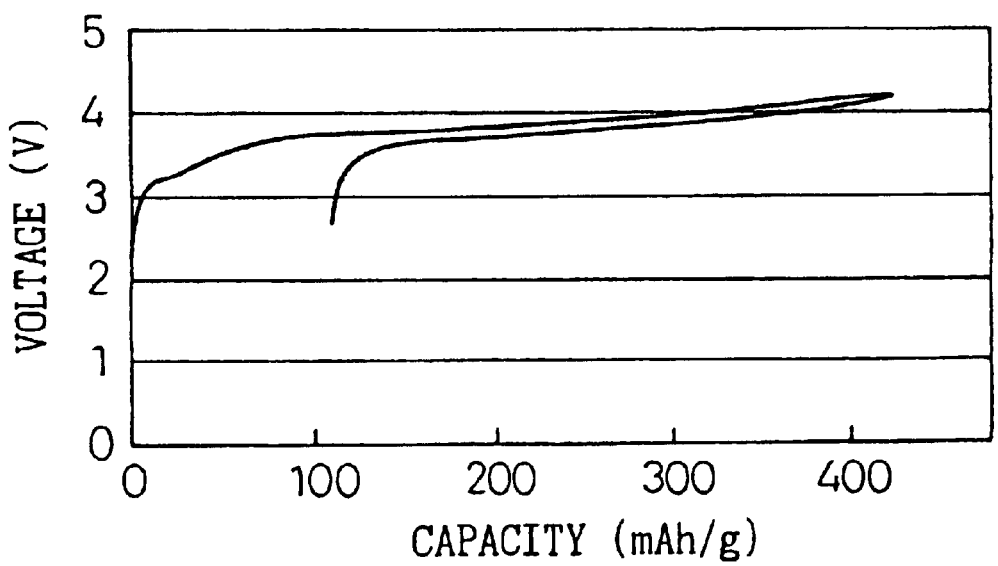
FIG. 6 is a view of the charge-discharge characteristics of Comparative Example 6.

The same procedure was followed as in Example 2 except that, instead of the high purity VC, the conventional synthesis method VC was used, to prepare a battery and a charge-discharge test conducted. FIG. 6 shows the initial charge-discharge curve.

Example 3

The same procedure was followed as in Example 1 except that, instead of the volume ratio of PC and DMC of 1:1, the volume ratio of PC, EC, and DMC was made 1:1:2, to prepare a battery and a charge-discharge test conducted.

The initial coulomb efficiencies of Examples 2 to 3 and Comparative Examples 4 to 6 are shown in Table 3. As clear from this Table, a good coulomb efficiency is obtained by use of high purity VC.

TABLE 3

| | Electrolyte solvent (volume ratio) | VC | Coulomb efficiency (%) |
|---|---|---|---|
| Example 2 | EC/DMC = 1/1 | High purity VC (2 wt %) | 79 |
| Comp. Ex. 4 | EC/DMC = 1/1 | None | 72 |
| Comp. Ex. 5 | EC/DMC = 1/1 | Aldrich VC (2 wt %) | 75 |
| Comp. Ex. 6 | EC/DMC = 1/1 | Conventional synthesis method VC (2 wt %) | 74 |
| Example 3 | PC/EC/DMC = 1/1/2 | High purity VC (2 wt %) | 80 |

Figure 7:
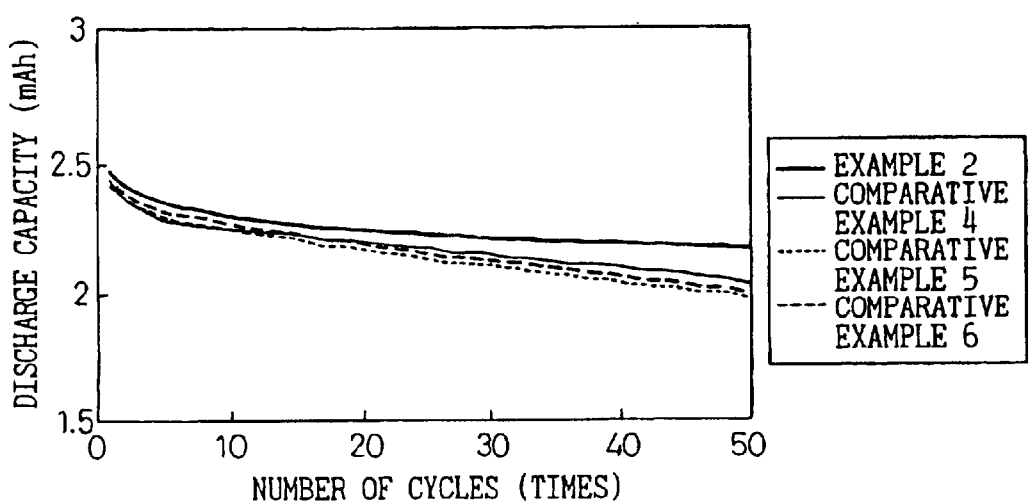
FIG. 7 is a view of the cycle characteristics of Example 2, Comparative Example 4, Comparative Example 5, and Comparative Example 6.

FIG. 7 is a view of cycle characteristics of Example 2 and Comparative Examples 4, 5 and 6 with the ordinate showing the discharge capacity (mAh) and with the abscissa showing the number of cycles.

As will be understood from FIG. 7, compared with Comparative Example 4 using no VC, Comparative Example 5 using Aldrich VC, and Comparative Example 6 using conventional synthesis method VC, a good cycle characteristics were maintained in Example 2 using high purity VC.

Figure 8:
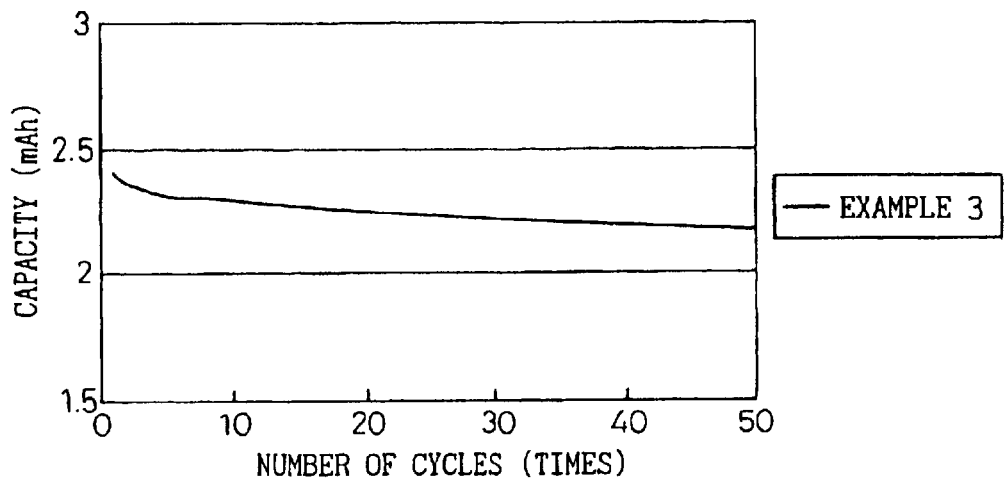
FIG. 8 is a view of the cycle characteristics of Example 3.

FIG. 8 shows the cycle characteristics of Example 3 with the ordinate showing the discharge capacity (mAh) and the abscissa showing the number of cycles. A good cycle characteristics are maintained.

Examples 4 to 6

The same procedure was followed as in Example 1 except for changing the volume ratio of the electrolyte solvent as shown in Table 4, to prepare batteries and conduct charge-discharge tests. The initial coulomb efficiencies are shown in Table 4. Further, it was learned that the cycle characteristics were good in the same way as in Example 1.

TABLE 4

| | Electrolyte solvent (volume ratio) | VC | Coulomb efficiency (%) |
|---|---|---|---|
| Example 4 | PC/EC/MEC = 5/30/65 | High purity VC (2 wt %) | 81 |
| Example 5 | PC/EC/DEC = 5/30/65 | High purity VC (2 wt %) | 80 |
| Example 6 | PC/EC/DEC/DMC = 5/30/30/35 | High purity VC (2 wt %) | 81 |

As is clear from the above description, the non-aqueous electrolyte of the present invention and the lithium secondary battery using the same contain high purity VC in the non-aqueous solvent, and therefore, graphite can be used as the anode active material. Further, a large electric capacity as seen by the coulomb efficiency is obtained. Further, good cycle characteristics are obtained.

What is claimed is:

1. A process for producing a vinylene carbonate comprising dehydrochlorinating chloroethylene carbonate in the presence of an amine in a high boiling point solvent having a boiling point of 170 to 300° C. and selected from the group consisting of carbonates, carboxylic esters and hydrocarbons.

2. A process for producing a vinylene carbonate as claimed in claim 1, wherein said carbonates comprise dibutyl carbonate, diisobutyl carbonate, dipentyl carbonate, dihexyl carbonate, dicyclohexyl carbonate, propylene carbonate, butylene carbonate and 1,2-methoxycarbonyl oxyethane.

3. A process for producing a vinylene carbonate as claimed in claim 1, wherein said carboxylic esters comprise octyl acetate, phenyl acetate, benzyl acetate, cyclohexyl acetate, hexyl propionate, phenyl propionate, methyl benzoate, ethyl benzoate, methyl phenylacetate, dimethyl adipate, diethyl malonate, dimethyl phthalate, ethyleneglycol diacetate, ε-caprolactone and γ-butyrolactone.

4. A process for producing a vinylene carbonate as claimed in claim 1, wherein said hydrocarbons comprise butylbenzene, sec-butylbenzene, cymene, diethylbenzene and 1-phenylhexane.

5. A process for producing a vinylene carbonate as claimed in claim 1, wherein said amine comprises triethylamine.

6. A process for producing a vinylene carbonate as claimed in claim 1, wherein said vinylene carbonate, after the dehydrochlorination, is distilled off by distillation prior to distillation of the high boiling point solvent.

7. A process for producing a vinylene carbonate as claimed in claim 1, wherein an amine hydrochloride formed in the process is first removed after the dehydrochlorination and then resultant vinylene carbonate is distilled off prior to distillation of the high boiling point solvent.

* * * * *